US009781608B2

(12) United States Patent
Dore et al.

(10) Patent No.: US 9,781,608 B2
(45) Date of Patent: Oct. 3, 2017

(54) METHOD FOR CONFIGURING A WIRELESS NETWORK

(75) Inventors: Renaud Dore, Cesson Sevigne (FR); Gilles Straub, Cesson Sevigne (FR); Francois Baron, Cesson Sevigne (FR); Patrick Fontaine, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 215 days.

(21) Appl. No.: 13/138,517

(22) PCT Filed: Mar. 2, 2010

(86) PCT No.: PCT/EP2010/052594
§ 371 (c)(1),
(2), (4) Date: Sep. 23, 2011

(87) PCT Pub. No.: WO2010/100131
PCT Pub. Date: Sep. 10, 2010

(65) Prior Publication Data
US 2012/0014288 A1 Jan. 19, 2012

(30) Foreign Application Priority Data
Mar. 5, 2009 (FR) ...................................... 09 51397

(51) Int. Cl.
*H04W 16/00* (2009.01)
*H04W 16/20* (2009.01)
(Continued)

(52) U.S. Cl.
CPC ......... *H04W 16/20* (2013.01); *H04B 17/3913* (2015.01); *H04L 41/08* (2013.01); *H04W 16/18* (2013.01)

(58) Field of Classification Search
CPC ..... H04W 16/18; H04W 16/20; H04W 16/22; H04W 16/226
(Continued)

(56) References Cited

U.S. PATENT DOCUMENTS 6,317,599 B1 * 11/2001 Rappaport et al. ........... 455/446
6,442,507 B1 * 8/2002 Skidmore et al. ............ 702/186
(Continued)

FOREIGN PATENT DOCUMENTS

EP         1670183      6/2006
EP      1 595 192 B1      5/2013
(Continued)

OTHER PUBLICATIONS

Search Report Dated May 4, 2010.
(Continued)

*Primary Examiner* — Brian O'Connor
(74) *Attorney, Agent, or Firm* — Myers Wolin LLC

(57) ABSTRACT

The invention relates to method for configuring a first wireless network that includes at least one access point. In order to optimize the configuration of the first wireless network, the method comprises a step of configuring at least one parameter of the at least one access point of the first wireless network on the basis of at least a portion of the linking balance of a second wireless network including at least two nodes, the nodes being positioned in a predetermined physical space.

24 Claims, 5 Drawing Sheets

Figure 1:
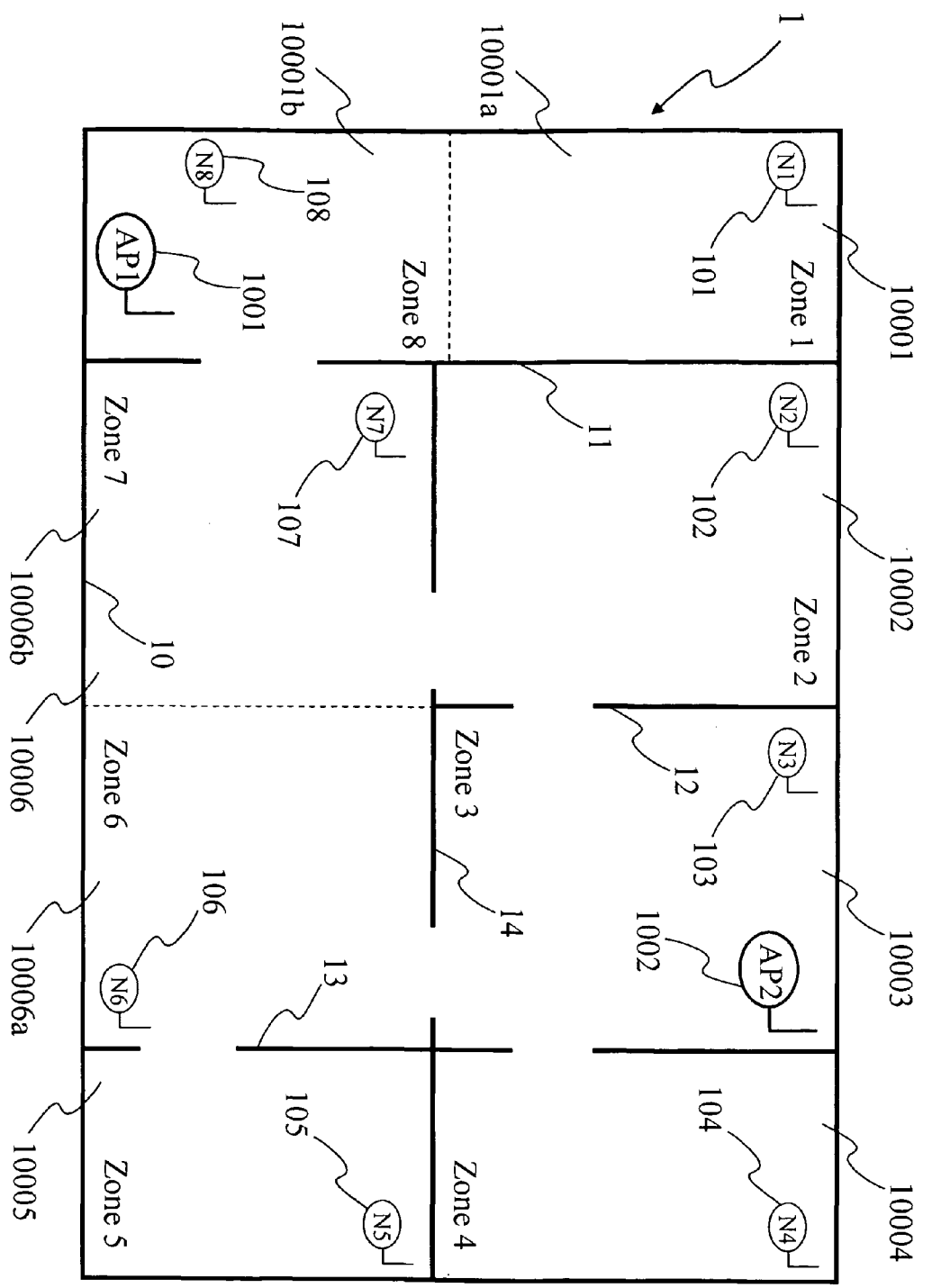

(51) Int. Cl.
*H04L 12/24* (2006.01)
*H04W 16/18* (2009.01)
*H04B 17/391* (2015.01)

(58) Field of Classification Search
USPC ....... 370/255, 328, 335, 338, 342, 400, 401, 370/402; 455/552.1
See application file for complete search history.

(56) References Cited

U.S. PATENT DOCUMENTS

| | | | |
|---|---|---|---|
| 6,771,966 B1* | 8/2004 | Chow | 455/446 |
| 6,931,235 B2* | 8/2005 | Kline | H04B 7/086 342/368 |
| 6,950,665 B2* | 9/2005 | Swift | H04B 7/086 375/132 |
| 7,146,433 B2* | 12/2006 | Cromer et al. | 709/239 |
| 7,171,208 B2* | 1/2007 | Rappaport | H04W 16/20 455/422.1 |
| 7,260,392 B2* | 8/2007 | Kitchin | 455/432.1 |
| 7,295,119 B2* | 11/2007 | Rappaport | G06F 17/509 340/5.8 |
| 7,295,960 B2* | 11/2007 | Rappaport et al. | 703/13 |
| 7,395,195 B2* | 7/2008 | Suenbuel | H04L 29/06 700/31 |
| 7,660,263 B1* | 2/2010 | Pfister et al. | 370/254 |
| 7,689,693 B2* | 3/2010 | Doshi et al. | 709/226 |
| 7,801,058 B2* | 9/2010 | Wang | 370/254 |
| 7,933,605 B2* | 4/2011 | Rappaport et al. | 455/446 |
| 7,969,910 B2* | 6/2011 | Barak et al. | 370/254 |
| 8,050,707 B2* | 11/2011 | Pirzada | H04W 24/02 455/414.1 |
| 8,060,017 B2* | 11/2011 | Schlicht et al. | 455/41.2 |
| 8,290,499 B2* | 10/2012 | Rappaport | H04W 16/20 455/422.1 |
| 8,296,407 B2* | 10/2012 | Doshi et al. | 709/223 |
| 8,305,936 B2* | 11/2012 | Wang | 370/254 |
| 8,451,773 B2* | 5/2013 | Jiao et al. | 370/328 |
| 2004/0110518 A1 | 6/2004 | Swift et al. | |
| 2004/0203431 A1 | 10/2004 | Cooper | |
| 2005/0059405 A1* | 3/2005 | Thomson | H04W 16/18 455/446 |
| 2005/0073980 A1* | 4/2005 | Thomson | H04W 16/20 370/338 |
| 2006/0142978 A1 | 6/2006 | Suenbuel et al. | |
| 2006/0182076 A1* | 8/2006 | Wang | 370/338 |
| 2007/0117567 A1 | 5/2007 | Rappaport et al. | |
| 2008/0146269 A1* | 6/2008 | Pirzada et al. | 455/552.1 |
| 2008/0188206 A1* | 8/2008 | Pirzada | H04W 24/02 455/414.1 |
| 2010/0189084 A1* | 7/2010 | Chen et al. | 370/338 |

FOREIGN PATENT DOCUMENTS

| | | |
|---|---|---|
| JP | 2007-74239 A | 3/2007 |
| JP | 2007-525040 A | 8/2007 |
| JP | 2008-306665 A | 12/2008 |
| WO | 01/78326 A2 | 10/2001 |
| WO | 01/78327 A2 | 10/2001 |
| WO | 2004/086783 A1 | 10/2004 |
| WO | WO2008004955 | 1/2008 |

OTHER PUBLICATIONS

Kim et al., "Interference-Aware Topology Control for Low Rate Wireless Personal Area Networks", IEEE Transactions on Consumer Electronics, IEEE Service Center, New York, NY, vol. 55, No. 1, Feb. 1, 2009, pp. 97-104.

* cited by examiner

METHOD FOR CONFIGURING A WIRELESS NETWORK

This application claims the benefit, under 35 U.S.C. §365 of International Application PCT/EP2010/052594, filed Mar. 2, 2010, which was published in accordance with PCT Article 21(2) on Sep. 10, 2010 in French and which claims the benefit of French patent application No. 0951397, filed Mar. 5, 2009.

1. DOMAIN OF THE INVENTION

The invention relates to the domain of telecommunications and more specifically to the management and the configuration of a wireless network.

2. PRIOR ART

According to the prior art, several architectures of WLAN (Wireless Local Area Network) networks are known. Some of them use a single access point to cover a space such as a house or the floor of a building by use for example of a heightened transmission power associated with various sophisticated technologies such as MIMO (Multiple Input Multiple Output) or OFDM (Orthogonal Frequency Division Multiplexing). Thus, a Wi-Fi® (based on the standard 802.11n) network access point attains a real bitrate of 100 Mbits/s within a radius of 90 meters due to MIMO and OFDM technologies and an access point to a HiperLAN2 network attains a bitrate of 50 Mbits/s within a radius of 45 meters. Such architectures based on a single access point present the disadvantage of producing a high level of interferences with respect to the neighbouring area and the risk of not covering the entire space to be covered, particularly in some zones separated from the access point by physical obstacles, such as walls causing strong attenuations of the signal transmitted. Moreover, the use of a heightened transmission power raises questions of public health relating to the risks linked to prolonged exposure to electromagnetic radiation.

Other wireless local network architectures use several access points, with a weaker transmission power than in the single access point architectures, spread within the space to be covered and connected together for example by a wired backbone. Such architectures are however complicated to configure. In fact it is difficult to correctly configure the parameters of each of the access points (for example the frequency channel and the transmission power) to ensure a total coverage of the space to be covered with a minimum of interferences. If the level of the transmission power is too weak, some zones of the space risk not being covered and if the transmission power is too strong, the interferences between the different access points risk being too high.

3. SUMMARY OF THE INVENTION

The purpose of the invention is to overcome at least one of these disadvantages of the prior art.

More specifically, the purpose of the invention is notably to optimise the configuration of a wireless network comprising at least one access point.

The invention relates to a method for configuration of a first wireless network comprising at least one access point. The method comprises a step of configuration of at least one parameter of the at least one access point of the first wireless network according to the at least a part of a link budget of a second wireless network comprising at least two nodes, the nodes being positioned in a determined physical space, the first and second wireless networks being physically different.

According to a specific characteristic, the first wireless network uses a first physical channel and the second wireless network uses a second physical channel, the first and second physical channels being different.

According to a particular characteristic, the method comprises a step of determination of the physical space comprising a step of memorisation of an item of information representative of elementary zones comprised in the physical space, the elementary zones each comprising at least one node of the second network.

Advantageously, the step of determination of the physical space also comprises a step of memorisation of an item of information representative of a location of at least one node in the elementary zone comprising it.

According to another characteristic, the method comprises a step of reception of the at least a part of the link budget of the second network.

Advantageously, the method comprises a step of determination of the at least a part of the link budget of the second network.

According to a specific characteristic, the parameter is selected from among:
  at least one spatial parameter,
  at least one physical layer parameter,
  at least one parameter of a layer above the physical layer,
    or any combination of these parameters.

According to another characteristic, the step of configuration comprises a step of determination of a link budget of the first network according to the link budget of the second network.

Advantageously, the link budget of the second network is according to power measurements received of a signal transmitted by at least one node and received by at least one other node of the second network, the measurements being carried out for at least two different transmission channel frequencies of the signal, the at least two transmission channel frequencies belonging to a same frequency band.

According to a particular characteristic, the second network is a mesh network.

According to a specific characteristic, the first network uses a first band of frequencies and the second network uses a second band of frequencies different to the first band of frequencies.

Advantageously, the difference between the first band of frequencies and the second band of frequencies is less than two octaves.

According to another characteristic, the distribution density of nodes of the second network in the physical space is greater than the distribution density of nodes of the first network in the physical space. Advantageously, the method comprises a request step to obtain the at least a part of the link budget of the second network.

4. LIST OF FIGURES

Figure 2:
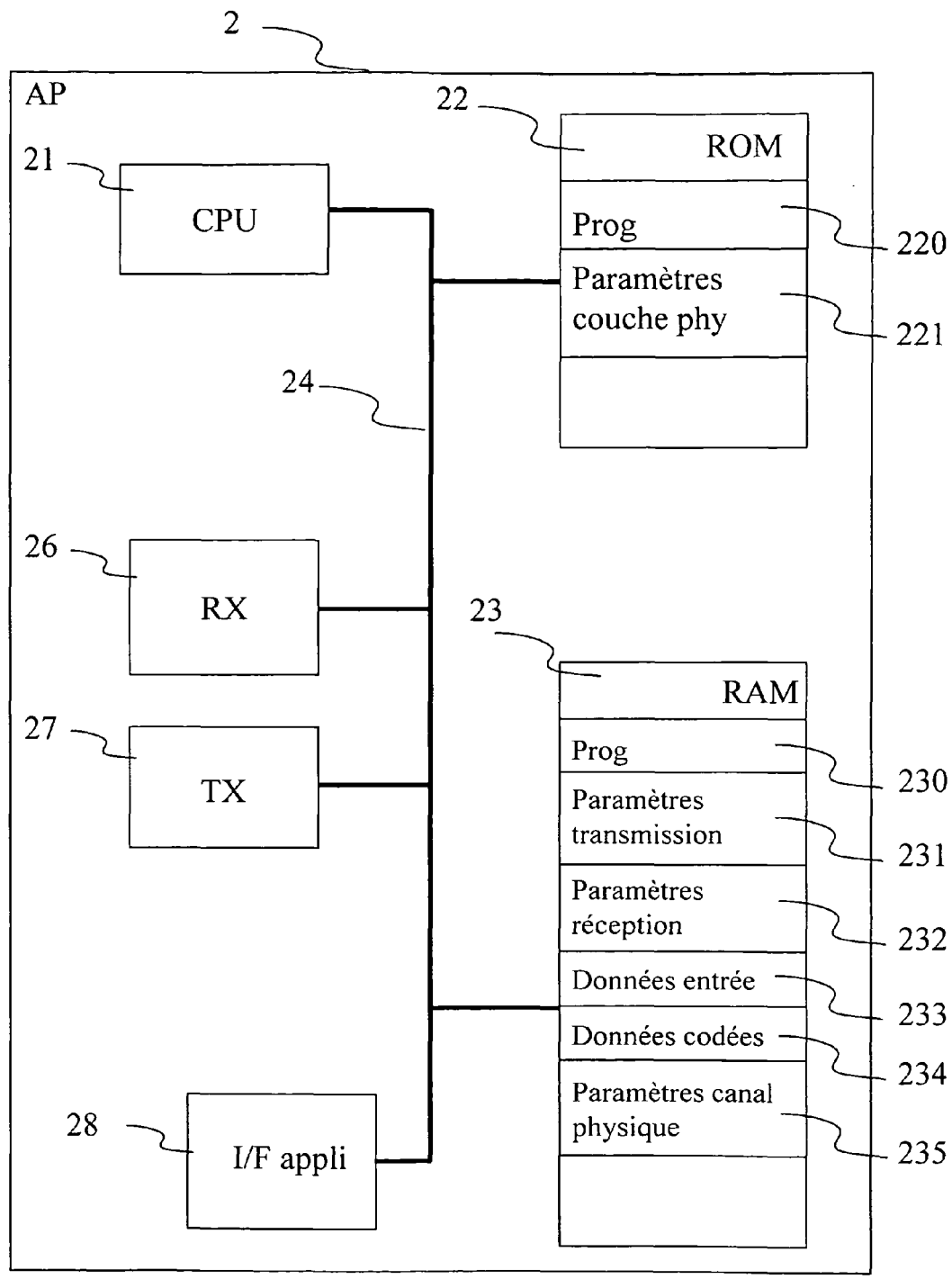
Figure 3:
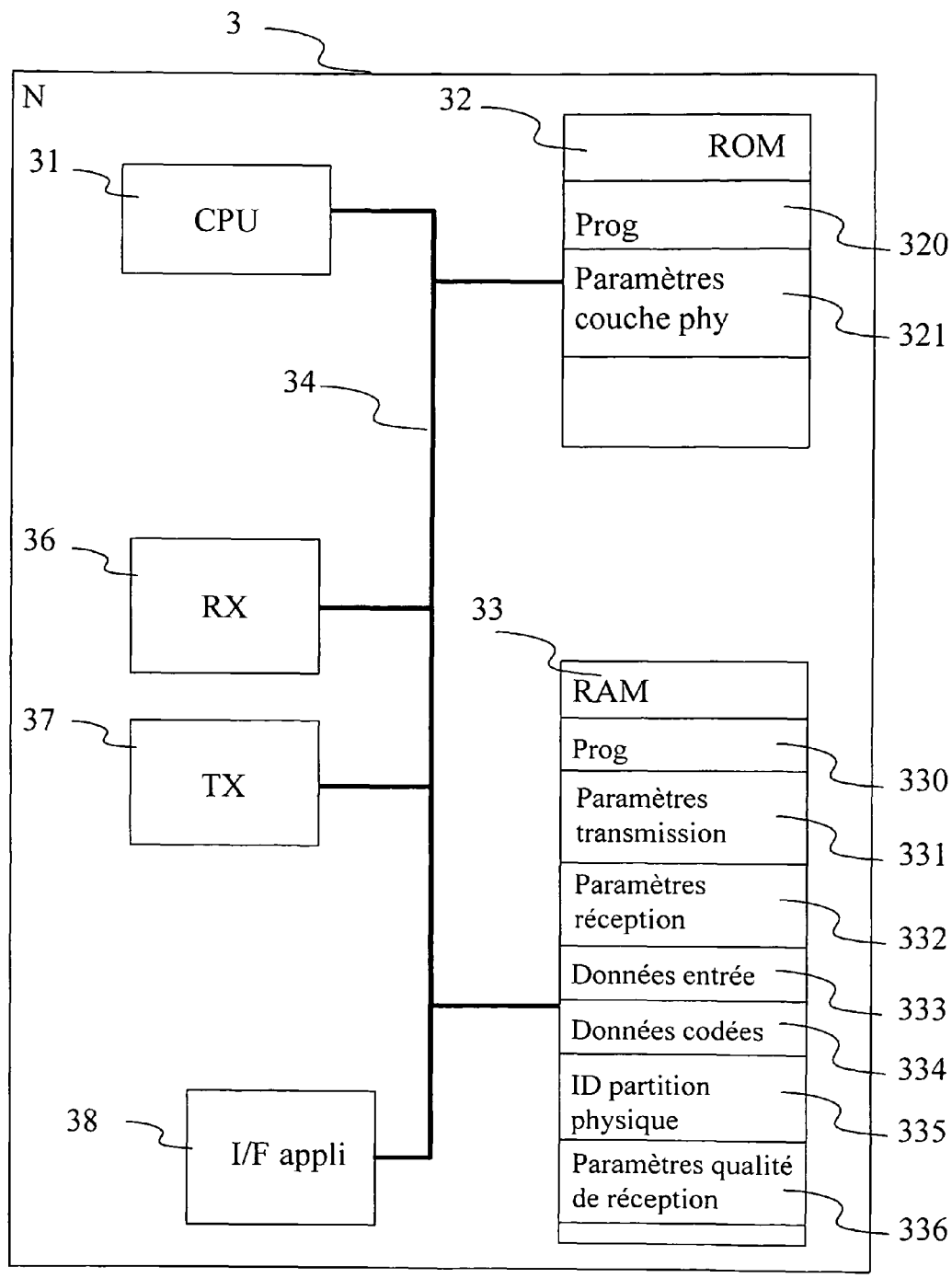
Figure 4:
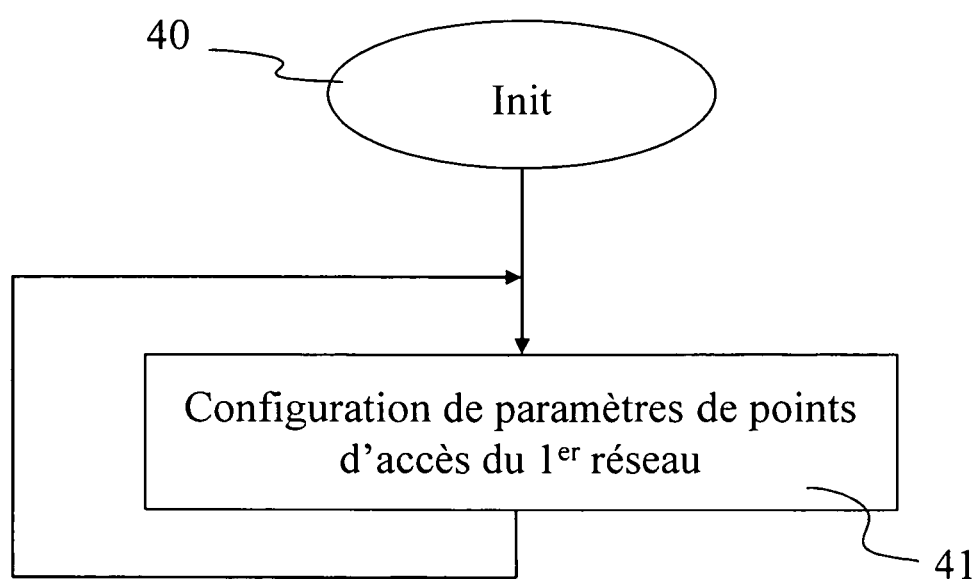
Figure 5:
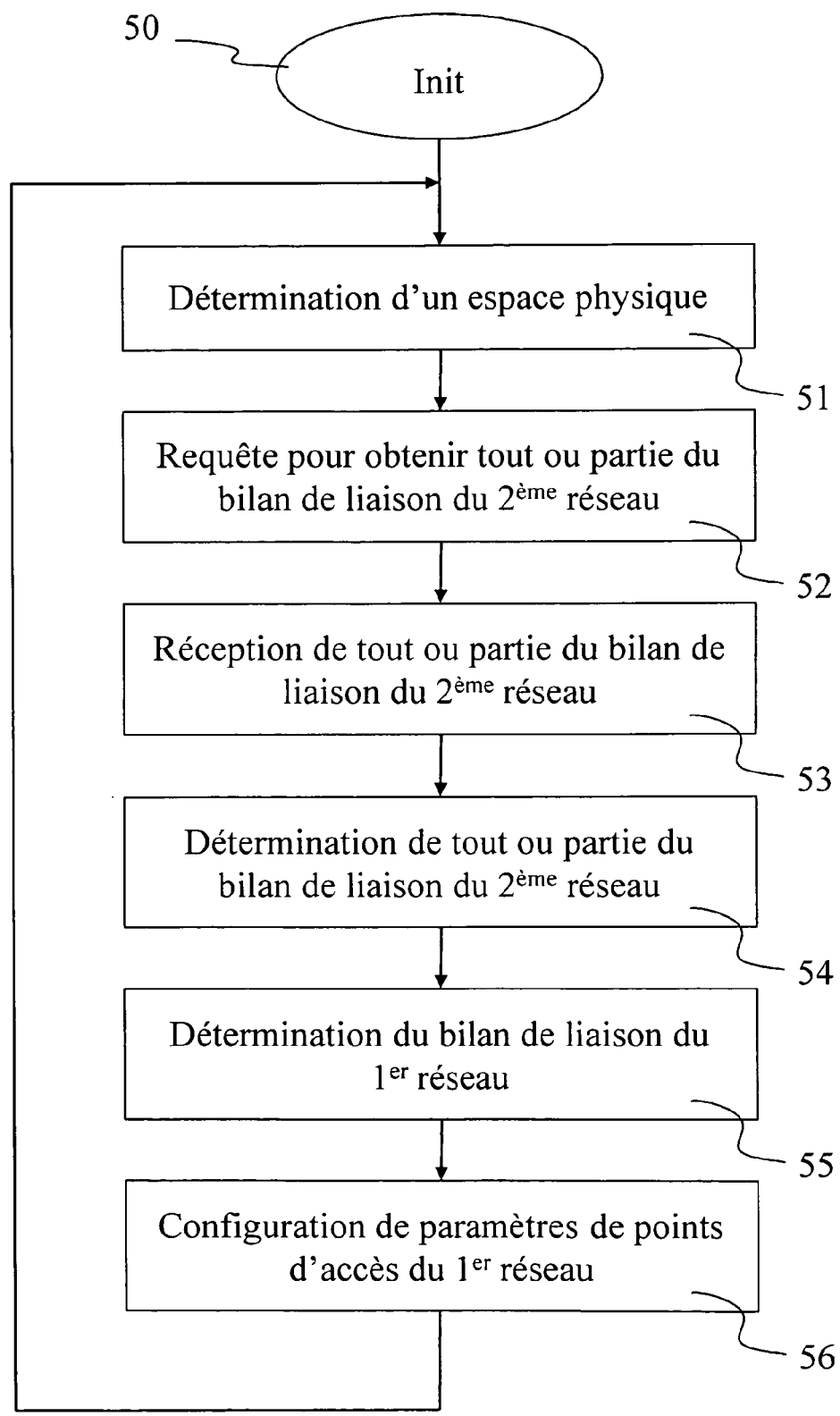

The invention will be better understood, and other specific features and advantages will emerge upon reading the following description, the description making reference to the annexed drawings wherein:

FIG. 1 shows a wireless system implementing two wireless networks, according to a particular embodiment of the invention;

FIGS. 2 and 3 diagrammatically show respectively an access point of a first network and a node of a second network of the system of FIG. 1, according to a particular embodiment of the invention, FIGS. 4 and 5 show a method for configuration of a first wireless network of the system of FIG. 1, according to particular embodiments of the invention.

5. DETAILED DESCRIPTION OF EMBODIMENTS OF THE INVENTION

FIG. 1 shows a wireless communications system 1 implementing two wireless networks. A first network comprises two access points AP1 1001 and AP2 1002 covering in transmission a space corresponding for example to a floor of a building or to a house and delimited by an exterior wall 10, that is to say covering the set of rooms 10001 to 10006. The access point AP1 1001 is located in a zone 8 10001b of a room 10001 and the access point AP2 1002 is located in a zone 3 corresponding to a room 10003. A second network comprises 8 nodes 101, 102, 103, 104, 105, 106, 107 and 108 distributed in a space corresponding for example to a floor of a building or to a house. This space is surrounded by a partition wall 10 that contains is and comprises rooms 10001, 10002, 10003, 10004, 10005 and 10006 delimited by walls 11, 12, 13, and 14 each comprising one or two openings to enable circulation of persons from one room to another. The rooms 10002, 10003, 10004 and 10005 each comprise a node, respectively referenced 102, 103, 104 and 105. The rooms 10001 and 10006 of greater size than the other rooms each comprise two nodes, respectively referenced 101, 108 and 106, 107. Each of the rooms containing a unique node forms a zone (called zone 2, zone 3, zone 4 and zone 5) and each of the rooms containing two nodes forms two zones, each of the zones comprising a unique node. Thus, the room 10001 comprising the nodes N1 101 and N8 108 forms two zones delimited by a dotted line, respectively zone 1 and zone 8 (respectively referenced 10001a and 10001b) each comprising a node, respectively N1 101 and N8 108. The room 10006 comprising the nodes N6 106 and N7 107 forms two zones delimited by a dotted line, respectively zone 6 and zone 7 (respectively referenced 10006a and 10006b) each comprising a node, respectively N6 106 and N7 107. The network comprising the nodes N1 to N8, called the second network in the remainder of the description, advantageously forms a mesh network using for example the protocol "Zigbee" based on the standard IEEE 802.15.4. The nodes N1 to N8 exchange data using one or several channel frequencies belong to the 2.4 GHz band of frequencies. The network comprising the access points AP1 and AP2, called the first network in the remainder of the description, advantageously forms a Wi-Fi® network and uses one or several channel frequencies belonging to the 5 GHz band of frequencies. The first wireless network is advantageously physically different from the second wireless network. Generally, a network is characterized by the access points or the nodes that comprise it, by the use of a band of frequencies, by the standard implemented, by a temporal period of activity. The first and second networks are different for example in that the access points (or the nodes) that comprise them are distinct and/or in that they use different bands of frequencies and/or in that they implement different standards (for example respectively Wi-Fi® and Zigbee) and/or in that the activity periods (that is to say periods of data transmission/reception) are different from one network to the other. According to a variant, the access points AP1, AP2 of the first network are different to the nodes 101 to 108 of the second network from a hardware perspective. According to a variant, the access points AP1, AP2 are different to the nodes 101 to 108 from a software perspective.

According to a variant, the second network forms a Wi-Fi network using for example one or more channel frequencies belonging to the 2.4 GHz band of frequencies. The first network and the second network advantageously use different bands of frequencies, for example 5 GHz for the first network and 2.4 GHz of the second network or the inverse. The separation between the frequency band used by the first network and that used by the second network is less than for example 2 octaves, advantageously less than 1 octave or less than 0.5 octaves.

According to another variant, the second network forms a mesh network using the "Bluetooth" protocol based on the standard IEEE 802.15.1 using one or several frequencies belonging to the 2.4 GHz band of frequencies.

According to an additional variant, the first wireless network uses a first physical channel and the second wireless network uses a second physical channel different from the first physical channel. Generally, a physical channel is characterized by a band of carrier frequencies, a frequency bandwidth and a time slot allocation schema. In the particular case of a CDMA (Code Division Multiple Access) access a physical channel is also characterized by a spread code.

Advantageously, the nodes 101 to 108 and the access points 1001, 1002 of the system 1 are fixed devices. One at least of the nodes 101 to 108 forms a system covering a "picocell" that is to say a small area, such as the interior of a building or a supermarket, that is to say having a range of a few dozen meters (for example less than 50 m). One at least of the access points 1001, 1002 also forms a system covering a "picocell". According to another variant, at least one of the nodes 101 to 108 forms a system designed to cover a "femtocell" that is an area restricted to a smaller size than a picocell, such as some rooms of a house or building, one floor of a building, a plane, that is to say having a range of a few meters (for example less than 10 meters). One at least of the access points 1001, 1002 also forms a system covering a "femtocell".

According to a variant, all the nodes 101 to 108 are of SISO (Single Input Single Output) type and have only a single antenna. Likewise, all of the access points 1001, 1002 are of SISO type.

According to another variant, all the nodes 101 to 108 are of MIMO type and have several antennas transmitting a MIMO signal. Likewise, all of the access points 1001, 1002 are of MIMO type.

According to another variant, some nodes 101 to 108 (respectively some of the access points 1001, 1002) of the system are of MIMO type and the others are of SISO type.

Advantageously, the distribution density of nodes of the second network in the physical space (that is to say the number of nodes distributed in the physical space) is greater than the distribution density of access points of the first network (that is to say the number of access points distributed in the physical space), for example the density of nodes of the second network is 2, 3, 4 or 5 times greater than the density of access points of the first network.

Advantageously, the access points 1001, 1002 are connected together by a wired connection, for example of type MoCA (Multimedia over Coax Alliance), Ethernet, PLC (Powerline Communication), POF (Plastic Optical Fibre) or again ITU G.hn (corresponding to the standard for next generation domestic networks technologies of the ITU (International Telecommunication Union)).

FIG. 2 diagrammatically shows a hardware embodiment of an access point 2 corresponding for example to the access points 1001, 1002 of FIG. 1.

The access point 2 comprises the following elements, connected to each other by a bus 24 of addresses and data that also transports a clock signal:
- a microprocessor 21 (or CPU (Central Processing Unit)),
- a non-volatile memory of ROM (Read Only Memory) type 22,
- a Random Access Memory or RAM 23,
- a radio interface 26,
- an interface 27 adapted for the transmission of data (for example broadcasting of services or point to multipoint or point to point transmission) and performing notably the functions of a coder and/or OFDM modulators,
- a MMI (Man Machine Interface) interface 28 or to a specific application suitable for displaying information for a user and/or inputting data or parameters (for example the setting of parameters of sub-carriers and of data to be transmitted).

It is noted that the word "register" used in the description of memories 22 and 23 designates in each of the memories mentioned, both a memory zone of low capacity (some binary data) as well as a memory zone of large capacity (enabling a whole programme to be stored or all or part of the data representative of data received or to be broadcast).

The memory ROM 22 comprises notably:
- a "prog" 220 program, and
- parameters 221 of physical layers.

The algorithms implementing the steps of the method specific to the invention and described below are stored in the ROM 22 memory associated with the access point 2 implementing these steps. When powered up, the microprocessor 21 loads and runs the instructions of these algorithms.

The random access memory 23 notably comprises:
- in a register 230, the operating programme of the microprocessor 21 responsible for switching on the access point 2,
- the transmission parameters 231 (for example parameters for modulation, encoding, MIMO, recurrence of frames),
- the reception parameters 232 (for example parameters for modulation, encoding, MIMO, recurrence of frames),
- incoming data 233,
- coded data 234 for transmission of data, and
- physical channel parameters 235 (for example allocation of a determined frequency, of a determined frequency bandwidth, of determined time slots, of a determined code and or sub-carrier intervals determined at the transmission of data by the access point 2).

The radio interface 26 is adapted for the reception of signals if necessary by one or several mobile terminals of the system 1 not shown in FIG. 1.

FIG. 3 diagrammatically shows a hardware embodiment of a node 3 corresponding for example to the nodes 101 to 108 of FIG. 1.

The node 3 comprises the following elements, connected to each other by a bus 34 of addresses and data that also transports a clock signal:
- a microprocessor 31 (or CPU (Central Processing Unit)),
- a non-volatile memory of ROM (Read Only Memory) type 32,
- a Random Access Memory or RAM 33,
- a radio interface 36,
- an interface 37 adapted for the transmission of data (for example broadcasting of services or point to multipoint or point to point transmission) and performing notably the functions of a coder,
- an MMI (Man Machine Interface) 28 or a specific application adapted for the display of information for a user and/or input of data or parameters.

It is noted that the word "register" used in the description of memories 32 and 33 designates in each of the memories mentioned, both a memory zone of low capacity (some binary data) as well as a memory zone of large capacity (enabling a whole programme to be stored or all or part of the data representative of data received or to be broadcast).

The memory ROM 32 comprises notably:
- a "prog" 320 program, and
- parameters 321 of physical layers.

The algorithms implementing the steps of the method specific to the invention and described below are stored in the ROM 32 memory associated with the node 3 implementing these steps. When powered up, the microprocessor 31 loads and runs the instructions of these algorithms.

The random access memory 33 notably comprises:
- in a register 330, the operating programme of the microprocessor 31 responsible for switching on the node 3,
- the transmission parameters 331 (for example parameters for modulation, encoding, MIMO, recurrence of frames),
- the reception parameters 332 (for example parameters for modulation, encoding, MIMO, recurrence of frames),
- incoming data 333,
- coded data 334 for transmission of data,
- data 335 representative of a physical partition identifier, each physical partition corresponding to a zone 1 to 8 containing a node as shown in FIG. 1, and
- reception quality parameters 336 of a signal transmitted by another node (for example the level of power of the received signal, the SNR (Signal to Noise Ratio).

The radio interface 36 is adapted for the reception of signals transmitted if necessary by one or several nodes 101 to 108 of the system 1.

FIG. 4 shows a method for configuration of a wireless network of the system 1, according to a particularly advantageous non-restrictive embodiment of the invention.

During an initialisation step 40, the various parameters of nodes 101 to 108 are updated. In particular, the parameters corresponding to the signals to be transmitted and to the corresponding sub-carriers if necessary are initialised in any manner (for example, following the reception of initialisation messages transmitted by a server not shown of the system 1, or by operator commands).

Then, during a step 41, one or several parameters of at least one access point of the first network, for example a Wi-Fi network using the 5 GHz band of frequencies, are configured. The parameters to be configured belong to a group comprising:
- a spatial parameter, that is to say for example the location of the access point in the physical space and/or in a physical partition, a number of access points to be installed to cover the physical space, a direction of one or several antennas,
- a physical layer parameter, that is to say for example a transmission channel frequency, a transmission channel bandwidth, a transmission power, and
- a parameter of a layer above the physical layer according to the OSI (Open Systems Interconnection) model, that is to say for example a temporal interval allocated for the transmission of a signal in TDMA (Time Division Multiple Access) a spread code in CDMA (Code Division Multiple Access), a communication protocol.

According to a variant, the group of parameters only comprises a single or two or three of the parameters listed above. According to another variant, the first parameter to be configured is a combination of at least two parameters of the group of parameters defined above, for example a combination associating a spatial parameter with a physical layer parameter.

The choice of the parameter or parameters to be applied to the access points of the first network is determined from the link budget established for the second network. The link budget of the second network translates the quality of the link between a node of the second network and another node of the second network. Thus, the global link budget of the second network groups together a set of values representative of the link quality for each node transmitter/node receiver pair and is represented in the form of an array N×N, where N is the number of nodes of the second network. Thus each node transmits a signal representative of an identifier of the signal transmitter node. The nodes receiving the signal transmitted advantageously estimate the RSSI (Received Signal Strength Indicator) of the signal received and decode the signal to extract the identifier of the signal transmitter node. An item of information representative of the identifier of the transmitter node associated with the estimated RSSI is stored in each node having estimated the RSSI and this information is transmitted to a controller of the second network centralizing all the transmitter identifier/estimated received signal RSSI pairs. The estimated RSSI for each transmitter node/receiver node pair is an indicator of the link quality for each transmitter node/receiver node pair.

According to a variant, another indicator representative of the link quality between a transmitter node and a receiver node is the BER (Bit Error Rate) or the FER (Frame Error Rate). In the same way as for the RSSI, the BER or the FER is estimated from a signal received by a node, the signal being transmitted by another node of the second network, according to any method known to those skilled in the art. Each node of the second network transmits a signal representative of its identifier and the nodes receiving this signal estimate the BER or the FER. A controller centralises this information and establishes an array representative of the link budget of the second network.

Each zone of the physical space to be covered by the access points of the first network containing a single node of the second network, the link budget determined between the node i and the node j of the second network corresponds to the link budget determined between a zone i and a zone j of the physical space.

The link budget of the second network is translated into a link budget of the first network, according to any method known to those skilled in the art, for example by calculation or from tables or empirically determined models, according to parameters representative of nodes of the second network and access points of the first network. Representative parameters are for example the antenna gain(s), the transmission power, the channel frequency, etc. The choice of the parameter or parameters to be configured for the at least one access points of the first network is advantageously made using an algorithm of tests and errors enabling the attainment of the parameters of the optimal access points to best cover the physical space to be covered while limiting for example interferences between the access points and the exterior of the physical space.

According to a variant, only one part of the link budget corresponding to some of the nodes of the second network is determined.

The physical space to be covered is advantageously determined by a user of the first network.

FIG. 5 shows a method for configuration of a wireless network of the system 1, according to a particularly advantageous non-restrictive embodiment of the invention.

During an initialisation step 50, the various parameters of nodes 101 to 108 are updated. In particular, the parameters corresponding to the signals to be transmitted and to the corresponding sub-carriers if necessary are initialised in any manner (for example, following the reception of initialisation messages transmitted by a server not shown of the system 1, or by operator commands).

Then, during a step 51, a physical space corresponding to the expected coverage zone of the access points of the first network, for example a Wi-Fi network is determined. The expected coverage zone corresponds to a space that a wireless network user wants to see covered by the access points, for example a floor of a building or a house. The definition of the physical space is advantageously carried out is several steps. First, the physical space is divided into one or several physical partitions. The partition of the space responds to several constraints. Each partition contains a node of a second network, for example a "Zigbee" type mesh network. Moreover, the physical obstacles incident on the propagation of signals transmitted by the nodes of the second network are taken into account for the definition of physical partitions: for example internal walls, external walls, ceiling, floor, etc. Concerning the rooms of a building or a house, a room of reduced dimensions (for example 5 m by 5 m) containing a node of the second network defines a physical partition. A room of greater dimensions (for example 10 m by 10 m) containing several nodes of the second network then contains as many physical partitions as there are nodes. If the coverage zone of access points of the first network must extend to the exterior of an internal space defined by a partition wall or exterior wall, the exterior space that the user of the first network wants to see covered by the access points of the first network is also partitioned into physical partitions each containing a node of the second network. The physical obstacles incident on the propagation of signals transmitted by the nodes of the second network are advantageously also taken into account for the definition of exterior physical partitions. Once the physical partitions of the physical space are defined, an identifier (for example an ascending number) is assigned to each of the physical partitions. Advantageously, the geographic position of the node in each of the physical partitions is specified in a physical space plan mode, that is to say according to two axes x and y representing for example the length of the physical space and its width. According to a variant, the position of the node in the physical space takes into account the next component: a z axis represented by the height of the physical partition, the physical space then being represented in three-dimensional mode. According to a variant, the position of the node in a physical partition is defined from approximate criteria, for example upper right or left corner, lower right or left corner, centre of the partition, middle of the upper or lower wall, middle of the right of left wall in plan mode and close to the floor, at mid-height in three-dimensional mode integrating the component z. According to another variant, the position of the node in a physical partition is defined precisely with the exact coordinates of the node in the partition.

Advantageously, all or some of the information representative of the definition of the physical space, that is to say the information relative to the partitions of the physical space and/or the information relative to the geographical position of a node in a partition, is recorded in a memory of a management device of the second network. According to a variant, the information representative of the definition of the physical space is recorded in a memory of a management device of the first network or directly in one of the access points of the first network, for example a master access point.

Then during a step 52, a request to obtain a part or all of the link budget of the second network, for example "Zigbee" type mesh network is received by an element of the second network, for example a controller of the second network or one or more nodes of the second network. Advantageously, this request is transmitted by an element of the first network, for example a controller or an access point of the first network. According to a variant, this request is transmitted by an individual responsible for the implementation or the management of the first network. According to another variant, this request is transmitted by a controller of the second network intended for one or several nodes of the second network. The request to obtain all or part of the link budget of the second network is advantageously transmitted before the installation and parameter configuration of access points of the first network in the physical space. According to a variant, the request is transmitted at regular intervals every day or every hour. According to another variant, the request is transmitted after any modification of one or several parameters of nodes of the second network, for example the addition or suppression of one or several nodes, modification of the transmission channel frequency of at least one of the nodes, displacement of one or several nodes modifying the definition of the physical space, etc.

Then during a step 53, a part of the link budget of the second network or the entire link budget of the second network is received by a controller of the second network. Advantageously, all or part of the link budget of the second network is received by a device belonging to the first network, for example a controller or an access point. According to a variant, the link budget is received by one of the nodes of the second network, for example a master node.

During a step 54, a part or the entire link budget of the second network is determined. To do this, the controller of the second network, connected to the second network by wired or wireless link, initialises the parameters of the second network, for example the channel frequency of the second network. Each node composing the second network then transmits its own driver intended for all the other nodes composing the second network, the driver of each node comprising a node identifier. Each node receiving the driver thus transmitted decodes the driver and records the identifier comprised in the driver received in a memory or in a table. For each driver received, the node estimates the RSSI (Received Signal Strength Indicator) of the signal received containing the driver considered and records it in a memory or in a table making the link between the identifier to the transmitter node of the signal for which the RSSI received power has been estimated. Thus, each node of the second network stores for each signal received containing a driver transmitted by another node the identifier of the transmitter node of the driver and stores opposite the information representative of the identifier of the driver the estimated RSSI value of the signal received containing the driver in question. One the measurements of RSSI have be carried out by all the nodes, each node transmits to the controller the measured RSSI values associated with the identifiers of transmitter nodes, as well as the identifier of the node that carried out these measurements. The controller thus centralises all of the RSSI measurements carried out by the set of nodes of the second network associated with the identifiers of node transmitter/node receiver pairs. An array containing the estimated RSSI values is then obtained, array N×N where N is the number of nodes, or array 8×8 in the system of FIG. 1 where the second network comprises 8 nodes. The following array is thus obtained for a network comprising N nodes:

$$\begin{pmatrix} & N_1 & N_2 & N_3 & \ldots & N_N \\ N_1 & - & P_{21} & P_{31} & \ldots & P_{N1} \\ N_2 & P_{12} & - & P_{32} & \ldots & P_{N2} \\ N_3 & P_{13} & P_{23} & - & \ldots & P_{N3} \\ \ldots & \ldots & \ldots & \ldots & \ldots & \ldots \\ N_N & P_{1N} & P_{2N} & P_{3N} & \ldots & - \end{pmatrix} \quad \text{Array (1) N×N}$$

Thus, the array (1) N×N contains the measured values of RSSI for each node transmitter/node receiver pair of the second network. $P_{21}$ is the RSSI measured by the node $N_2$ of a signal transmitted by the node $N_1$, $P_{31}$ is the RSSI measured by the node $N_3$ of a signal transmitted by the node $N_1$, $P_{12}$ is the RSSI measured by the node $N_1$ of a signal transmitted by the node $N_2$ and so on. In the case where the driver transmitted by the node j was not received or understood by the node i, the value of the corresponding RSSI is non-determined.

In the system of FIG. 1 where the second network comprises 8 nodes, the following array is obtained:

$$\begin{pmatrix} & N_1 & N_2 & N_3 & N_4 & N_5 & N_6 & N_7 & N_8 \\ N_1 & - & P_{21} & P_{31} & P_{41} & P_{51} & P_{61} & P_{71} & P_{81} \\ N_2 & P_{12} & - & P_{32} & P_{42} & P_{52} & P_{62} & P_{72} & P_{82} \\ N_3 & P_{13} & P_{23} & - & P_{43} & P_{53} & P_{63} & P_{73} & P_{83} \\ N_4 & P_{14} & P_{24} & P_{33} & - & P_{54} & P_{64} & P_{74} & P_{84} \\ N_5 & P_{15} & P_{25} & P_{34} & P_{45} & - & P_{65} & P_{75} & P_{85} \\ N_6 & P_{16} & P_{26} & P_{35} & P_{46} & P_{56} & - & P_{76} & P_{86} \\ N_7 & P_{17} & P_{27} & P_{36} & P_{47} & P_{57} & P_{67} & - & P_{87} \\ N_8 & P_{18} & P_{28} & P_{37} & P_{48} & P_{58} & P_{68} & P_{78} & - \end{pmatrix} \quad \text{Array (2) 8×8}$$

As each physical partition of the physical space contains a unique node, the number of the node $N_1$ to $N_N$ also corresponds to the number or to the identifier of the physical partition.

Using the array comprising the estimated RSSI values for each node transmitter/node receiver pair, it is possible to deduce the link budget array by applying to each element of the array the following calculation:

$$L_{ij} = P_{ij} - \text{AntennaGain}(i) - \text{AntennaGain}(j) - \text{TransmittedPower}(j) - C_{ij} \quad \text{(Equation 1)}$$

where $L_{ij}$ corresponds to the value in dB of the link budget between the partitions i and j, $P_{ij}$ corresponds to the RSSI (signal transmitted by j and received by i), AntennaGain(i) corresponds to the antenna gain difference of the receiver node with respect to the omnidirectional antenna (or receiver partition) i, AntennaGain(j) corresponds to the antenna gain difference of the transmitter node j with respect to the omnidirectional (or transmitter partition), TransmittedPower (j) corresponds to the transmission power of the transmitter node j (or transmitter partition) and $C_{ij}$ is a constant. $C_{ij}$ is by default null, otherwise C, that depends on the precision of the geographical position of nodes i and j in their respective physical partitions, takes a non-null value that is determined by theoretical calculation or by experience.

In the case where the driver transmitted by a node j was not received or understood by a node i, that is to say when the value of the corresponding RSSI is non-determined, the value of the link budget between the nodes i and j is infinite.

The following link budget array is thus obtained:

$$\begin{pmatrix} & N_1 & N_2 & N_3 & N_4 & N_5 & N_6 & N_7 & N_8 \\ N_1 & - & L_{21} & L_{31} & L_{41} & L_{51} & L_{61} & L_{71} & L_{81} \\ N_2 & L_{12} & - & L_{32} & L_{42} & L_{52} & L_{62} & L_{72} & L_{82} \\ N_3 & L_{13} & L_{23} & - & L_{43} & L_{53} & L_{63} & L_{73} & L_{83} \\ N_4 & L_{14} & L_{24} & L_{34} & - & L_{54} & L_{64} & L_{74} & L_{84} \\ N_5 & L_{15} & L_{25} & L_{35} & L_{45} & - & L_{65} & L_{75} & L_{85} \\ N_6 & L_{16} & L_{26} & L_{36} & L_{46} & L_{56} & - & L_{76} & L_{86} \\ N_7 & L_{17} & L_{27} & L_{37} & L_{47} & L_{57} & L_{67} & - & L_{87} \\ N_8 & L_{18} & L_{28} & L_{38} & L_{48} & L_{58} & L_{68} & L_{78} & - \end{pmatrix} \quad \text{Array (3) 8×8}$$

Advantageously, step 54 loops back on itself and the controller of the second network re-initialises the second network assigning another value for the channel frequency used by the nodes of the second network. The RSSI for each node transmitter/node receiver pair is then estimated again and the link budget is again determined on the basis of the new channel frequency used. This operation is advantageously reiterated for several channel frequencies. The link budget array of the second network is then determined by averaging all the values of the link budget calculated for the different channel frequencies used. The result obtained thus has the advantage of being more precise and less dependent on the frequency diversity of the frequency channel. According to a variant, the channel frequencies used for the calculation of the link budget belong to a same frequency band, for example the frequency band 2.4 GHz or the frequency band 5 GHz.

According to a variant, the link budget of the second network is determined for a part only of the second network, that is to say for some of the nodes of (or of partitions covered by the) second network. The link budget is for example determined by the nodes N1, N2, N7 and N8 only or for the nodes N3, N4, N5 and N6 only.

According to another variant, a part of the link budget is received as described in step 53 and another part (or an additional part) of the link budget of the second network is determined as described in step 54.

Then during a step 55, the link budget of the first network, for example a Wi-Fi network, is determined. To do this, each element of the array of the link budget of the second network is translated into an element $L'_{ij}$ representative of the link budget between the partitions i and j in the first network. Thus, to each element is applied the following formula to obtain $L'_{ij}$:

$$L'_{ij} = L_{ij} + 10 \log_{10}(F_2/F_1) + 10 \log_{10}(\text{WidthChannel}_2 \text{WidthChannel}_1) - C \quad \text{(equation 2)}$$

where $L'_{ij}$ represents the link budget of the first network between the partitions i an j expressed in dB, $L_{ij}$ represents the link budget of the second network between the partitions i and j expressed in dB, $F_2$ is the frequency used by the second network, for example 2.4 GHz, $F_1$ is the frequency used by the first network, for example 5 GHz, WidthChannel$_2$ is the width of a channel in the second network, for example 200 kHz, WidthChannel$_1$ is the width of a channel in the first network, for example 20 MHz, C is a constant determined by the theoretical calculation of the absorption difference between the two frequencies $F_1$ and $F_2$ or by experience.

In the case where $L_{ij}$ takes a non-determined value, $L'_{ij}$ also takes a non-determined value. An array representative of the link budget of the first network is thus obtained:

$$\begin{pmatrix} & N_1 & N_2 & N_3 & N_4 & N_5 & N_6 & N_7 & N_8 \\ N_1 & - & L'_{21} & L'_{31} & L'_{41} & L'_{51} & L'_{61} & L'_{71} & L'_{81} \\ N_2 & L'_{12} & - & L'_{32} & L'_{42} & L'_{52} & L'_{62} & L'_{72} & L'_{82} \\ N_3 & L'_{13} & L'_{23} & - & L'_{43} & L'_{53} & L'_{63} & L'_{73} & L'_{83} \\ N_4 & L'_{14} & L'_{24} & L'_{34} & - & L'_{54} & L'_{64} & L'_{74} & L'_{84} \\ N_5 & L'_{15} & L'_{25} & L'_{35} & L'_{45} & - & L'_{65} & L'_{75} & L'_{85} \\ N_6 & L'_{16} & L'_{26} & L'_{36} & L'_{46} & L'_{56} & - & L'_{76} & L'_{86} \\ N_7 & L'_{17} & L'_{27} & L'_{37} & L'_{47} & L'_{57} & L'_{67} & - & L'_{87} \\ N_8 & L'_{18} & L'_{28} & L'_{38} & L'_{48} & L'_{58} & L'_{68} & L'_{78} & - \end{pmatrix} \quad \text{Array (4) 8×8}$$

According to a variant, the link budget of the first network is determined by conversion of the link budget array of the second network from conversion tables determined empirically.

Advantageously, the link budget array of the first network is converted into an array of the signal received from the first network by addition to each element of the of the link budget array of the transmission power (expressed in dB) of nodes constituting the first network and transmission and reception antenna gains differences with respect to an omnidirectional antenna.

According to a variant, a margin of error determined empirically or by theoretical calculation according to any method known to those skilled in the art is added to each element of the link budget array of the first network, for example equal to 10 dB plus or minus 5 dB. The addition of such an error margin enables account to be taken of the spatial sampling errors of the second network, the dispersions appearing in a physical partition as well as the translation error to pass from the frequency of the second network to the frequency of the first network.

According to another variant, the link budget array of the first network is converted into a sparse array by removing from each element of the link budget array a threshold value representative of a sensitivity threshold of the first network (for example −60 or −80 dBm). This sparse array thus enables the display of empty spaces representative of impossible interconnections between two physical partitions as well as operating margins (or link margins) expressed in dB. The operating margins of the first network are all the more positive as the interconnection between two physical partitions is good. The threshold value representative of the sensitivity threshold of the first network is advantageously dependent on the modulation type applied during the transmission of signals via an access point of the first network, for example sub-carrier modulation in QAM (Quadrature Amplitude Modulation), BPSK (Binary Phase-Shift Keying) or QPSK (Quadrature Phase-Shift Keying).

According to another variant, the link budget array of the first network is converted into an array displaying of the level of interferences generated over the overlapping zones of the two physical partitions. Such an array is obtained by removing from each element of the array representative of the link budget of the first network a signal-to-noise or signal-to-interference threshold value C/I, for a default transmission power value of each node of the first network. The values obtained are all the more positive as the interferences appearing between the two physical partitions increase. Such an array offers the advantage of rapidly locating between which partitions the interferences will be greatest, and thus where the connectivity will be less effective.

Before determining the link budget of the first network, the parameters of the second network are memorised, for example in a controller or a node of the second network, or in a controller or an access point of the first network. The parameters of the second network belong to a group comprising:
- a list of frequencies that can be used by the nodes of the second network,
- a list of nodes of the second network available to establish a link budget array of the second network,
- the transmission power used for each of the nodes to calculate the link budget of the second network, the maximum admissible transmission power being advantageously used to determine the link budget,
- an antenna gain value of each node of the second network, the antenna gain being advantageously identical for each of the nodes, and
- for each node, a physical partition identifier associated with the node, that is to say comprising the node.

In the same way, the general parameters of the first network are advantageously known and memorised before determining the link budget of the first network. The general parameters comprise for example the channel frequency used, the channel width, the transmission power(s) and the antenna gain(s). According to a variant, specificities of some nodes (for example access points, mobile stations of the first network) of the first network are taken into account for the determination of the link budget of the first network, for example a transmission power other than that used by other nodes, imposed location of one or several nodes.

Finally, during a step 56, one or several parameters of access points of the first network, for example a WI-Fi network, are configured. The parameters to be configured belong to a group comprising:
- a spatial parameter, that is to say for example the location of the access point in the physical space and/or in a physical partition, a number of access points to be installed to cover the physical space, a direction of one or several antennas,
- a physical layer parameter, that is to say for example a transmission channel frequency, a transmission channel bandwidth, a transmission power, and
- a parameter of a layer above the physical layer according to the OSI (Open Systems Interconnection) model, that is to say for example a temporal interval allocated for the transmission of a signal in TDMA (Time Division Multiple Access) a spread code in CDMA (Code Division Multiple Access), a communication protocol.

According to a variant, the group of parameters only comprises a single or two or three of the parameters listed above. According to another variant, the first and second parameters are a combination of at least two parameters of the group of parameters defined above, for example a combination associating a spatial parameter with a physical layer parameter.

The choice of the parameter or parameters to be configured for one at least of the access points of the first network is advantageously carried out using a trial and error algorithm enabling the optimum access points parameters to be obtained to best cover the physical space while limiting for example interferences between the access points and the exterior of the physical space. The transmission geographic coverage that an access point must assure is calculated for example from a sparse array determined in the preceding step. From an array displaying the level of interferences as determined in the preceding step, the mutual interferences appearing in each position of a node (for example a mobile station) of the first network are determined with respect to the possible positions of access points of the first network. The trial and error algorithm thus enables modelling by combination of all the parameters notably the location of access points in the physical space (for example indication of the physical partition in which an access point should be located), the number of access points required, the minimum transmission power to be applied to each access point, the transmission channel frequency to be used for each access point, etc.

According to a variant, priority parameters are sought, for example transmission maximum power of access points, number of access points, position of the access point or access points and the remaining configuration parameters are calculated according to these imposed priority parameters.

Naturally, the invention is not limited to the embodiments previously described.

In particular, the invention is not limited to a first network comprising two access points and a second network comprising eight nodes but extends to a system comprising a first network comprising at least one access point and a second network comprising at least two nodes.

The first network is not limited to a Wi-Fi network using a 5 GHz frequency band but extends to any WLAN type wireless network, such as for example HiperLAN2 or Femto using LTE (Long Term Evolution) or using HSDPA (High Speed Downlink Packet Access). In the same way, the second network is not limited to a mesh network of light nodes of "Zigbee" type but extends to any wireless network of type WLAN or WPAN (Wireless Personal Area Network), such as for example a Wi-Fi network using the 2.4 GHz frequency band (standards IEEE 802.11b or IEEE 802.11g), a Bluetooth type network (standard IEEE 802.15.1) or a ETSI HiperPAN network.

According to a variant, the link budget of the second network is determined from the BER (Bit Error Rate) or the FER (Frame Error Rate). Thus, the BER or the FER is estimated by a node receiving a signal transmitted by another node, the signal being representative of an identifier of the signal transmitter node. An array regrouping the BER or FER estimated values for each node transmitter/node receiver pair is thus obtained, enabling an array representative of the link budget of the second network to be defined.

According to another variant, each zone or physical partition of the physical space contains more than one node of the second network, for example 2 or 3 nodes. The estimated RSSI value between two partitions i and j comprising several nodes corresponds to the average of RSSI measured for example by the nodes of the partition i each receiving one or several signals transmitted by each node of the partition j. The link budget established between a partition i and a partition j corresponds to the average of link budgets for each possible node of partition i/node of partition j pair.

The invention claimed is:
1. A method for configuration of a first wireless network including at least one access point, the method comprising:
configuring, by a computer processor, at least one parameter of said at least one access point of the first wireless network according to at least a part of a link budget of a second wireless network including at least two nodes, said nodes being positioned in a determined physical space, said first and second wireless networks being physically different, said first wireless network using a protocol based on IEEE 802.11 and said second wireless network using a protocol not based on IEEE 802.11, wherein the configuring comprises determining a link budget of the first wireless network according to the link budget of the second wireless network, wherein the link budget of the second wireless network is according to measurements of received power of a signal transmitted by at least one node and received by at least one other node of the second wireless network, said measurements being carried out for at least two different transmission channel frequencies of said signal, said at least two transmission channel frequencies belonging to a same frequency band.

2. The method according to claim 1, wherein the first wireless network uses a first physical channel and the second wireless network uses a second physical channel, the first and second physical channels being different.

3. The method according to claim 1, wherein the method comprises determining said physical space, said determining comprising memorizing an item of information representative of elementary zones comprised in the physical space, said elementary zones each comprising at least one node of the second wireless network.

4. The method according to claim 3, wherein determining said physical space also comprises memorizing an item of information representative of a location of at least one node in the elementary zone comprising the at least one node.

5. The method according to claim 1, wherein the method comprises receiving the at least a part of the link budget of the second wireless network.

6. The method according to claim 1, wherein the method comprises determining the at least a part of the link budget of the second wireless network.

7. The method according to claim 1, wherein said parameter is selected from among:
at least one spatial parameter,
at least one physical layer parameter,
at least one parameter of a layer above the physical layer,
or any combination of these parameters.

8. The method according to claim 1, wherein the second wireless network is a mesh network.

9. The method according to claim 1, wherein the first wireless network uses a first band of frequencies and the second wireless network uses a second band of frequencies different to the first band of frequencies.

10. The method according to claim 9, wherein the difference between the first band of frequencies and the second band of frequencies is less than two octaves.

11. The method according to claim 1, wherein the distribution density of nodes of the second wireless network in said physical space is greater than the distribution density of nodes of the first wireless network in said physical space.

12. The method according to claim 5, wherein the method comprises requesting to obtain the at least a part of the link budget of the second wireless network.

13. A device configured for configuring a first wireless network including at least one access point, the device comprising:
a processor configured to compute at least one parameter of said at least one access point of the first wireless network according to at least a part of a link budget of a second wireless network including at least two nodes, said nodes being positioned in a determined physical space, said first and second wireless networks being physically different, said first wireless network using a protocol based on IEEE 802.11 and said second wireless network using a protocol not based on IEEE 802.11, wherein the processor is further configured to determine a link budget of the first wireless network according to the link budget of the second wireless network, wherein the link budget of the second wireless network is according to measurements of received power of a signal transmitted by at least one node and received by at least one other node of the second wireless network, said measurements being carried out for at least two different transmission channel frequencies of said signal, said at least two transmission channel frequencies belonging to a same frequency band.

14. The device according to claim 13, wherein the first wireless network uses a first physical channel and the second wireless network uses a second physical channel, the first and second physical channels being different.

15. The device according to claim 13, further comprising: a memory device configured to memorize information representative of elementary zones comprised in the physical space, said elementary zones each comprising at least one node of the second wireless network, said processor being further configured to determine said physical space from the memorized information.

16. The device according to claim 15, wherein said memory device is further configured to memorize information representative of a location of at least one node in the elementary zone comprising the at least one node.

17. The device according to claim 13, wherein the processor is further configured to receive the at least a part of the link budget of the second wireless network.

18. The device according to claim 13, wherein the processor is further configured to determine the at least a part of the link budget of the second wireless network.

19. The device according to claim 13, wherein said parameter is selected from among:
at least one spatial parameter,
at least one physical layer parameter,
at least one parameter of a layer above the physical layer,
or any combination of these parameters.

20. The device according to claim 13, wherein the second wireless network is a mesh network.

21. The device according to claim 13, wherein the first wireless network uses a first band of frequencies and the second wireless network uses a second band of frequencies different to the first band of frequencies.

22. The device according to claim 21, wherein the difference between the first band of frequencies and the second band of frequencies is less than two octaves.

23. The device according to claim 13, wherein the distribution density of nodes of the second wireless network in said physical space is greater than the distribution density of nodes of the first wireless network in said physical space.

24. The device according to claim 17, wherein the processor is further configured to request the at least a part of the link budget of the second wireless network.

* * * * *